UNITED STATES PATENT OFFICE.

THILO KROEBER, OF BASEL, SWITZERLAND, ASSIGNOR TO SOCIETY OF CHEMICAL INDUSTRY IN BASLE, OF BASEL, SWITZERLAND.

BROWN AZO DYE AND PROCESS OF MAKING SAME.

No. 807,289.      Specification of Letters Patent.      Patented Dec. 12, 1905.

Application filed July 15, 1905. Serial No. 269,864. (Specimens.)

*To all whom it may concern:*

Be it known that I, THILO KROEBER, chemist and doctor of philosophy, a subject of the Duke of Saxe-Altenburg, and a resident of Basel, Switzerland, have invented new and useful Improvements in the Manufacture of Monoazo Dyestuffs, of which the following is a full, clear, and complete specification.

For the manufacture of brown monoazo dyestuffs developed by chroming orthodiazophenol derivatives have hitherto been advantageously combined with metadiamins and their sulfonic acids. Triamido derivatives of benzene have not hitherto been used for this purpose.

According to the present invention the derivatives of triamidobenzene corresponding to the general formula

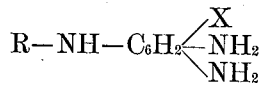

(wherein R is a radical of the benzene or naphthalene series and X hydrogen, $SO_3H$, or COOH) are combined with orthodiazophenol derivatives for the manufacture of brown dyestuffs, which when developed by chroming are faster to copper and copper salts than are the analogous products from diamins. The triamido derivatives in question are easily obtained by condensing, for example, 1:3:4-dinitrochlorobenzene, its sulfonic acid, ($NO_2:NO_2:Cl:SO_3H = 1:3:4:5$,) or dinitrochlorobenzenesulfonic acid, ($NO_2:NO_2:Cl:SO_3H = 2:6:1:4$,) or either of the two corresponding dinitrochlorobenzoic acids, with bases of the benzene and naphthalene series, their sulfonic and carboxylic acids, and reducing the condensation products thus formed. The combination of the diazo derivatives with the triamidobenzene derivatives occurs in part, even in mineral acid solution, better in acetic acid or sodium carbonate solution. The new dyestuffs thus obtained correspond to the general formula

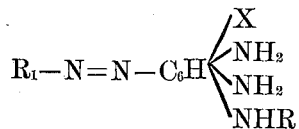

(wherein X signifies hydrogen, $SO_3H$, or COOH, R an aromatic radical, and $R_1$ the radical of an orthodiazophenol,) and dissolve in water with yellow-brown to violet-brown coloration and give on wool in acid-bath brown tints, which become by chroming fast to light and fast to fulling.

Example I: The diazo derivative obtained in the known manner from twenty kilos of picramic acid and seven kilos of sodium nitrite is mixed with a concentrated aqueous solution of thirty kilos diamidodiphenylaminsulfonic acid obtained by condensation of 1:3:4-dinitrochlorobenzene with metasulfanilic acid and subsequent reduction. While stirring well thirty kilos of sodium acetate are added, and the mixture is then heated after one hour to 40° centigrade, and twenty kilos of sodium carbonate are slowly introduced. The dyestuff is then salted out. It dissolves in water with a violet-brown coloration and in concentrated sulfuric acid with a carmine-red coloration. It dyes wool in an acid-bath black brown, which becomes when subsequently chromed beautiful yellow brown fast to light and fulling. The dyestuff is characterized by its fastness to copper and copper salts. It can consequently be dyed in copper vessels without suffering any change of the tints to be obtained. If in this example the diamidodiphenylaminmetasulfonic acid is replaced by the corresponding parasulfonic acid, (obtained by condensing 1:3:4-dinitrochlorobenzene with parasulfanilic acid,) an analogous dyestuff is obtained. The isomeric diamidodiphenylaminsulfonic acid obtained by condensation of 2:6-dinitro-1-chlorobenzene-4-sulfonic acid with anilin and subsequent reduction of the dinitro compound gives a dyestuff dyeing wool red-brown tints turning to deep reddish-brown when subsequently chromed.

Example II: The diazo compound obtained from 15.4 kilos of nitroamidophenol ($NO_2:NH_2:OH = 1:3:4$) and seven kilos of sodium nitrite is added to an aqueous solution of thirty kilos diamidodiphenylaminmetasulfonic acid (obtained from 1:3:4-dinitrochlorobenzene and metasulfanilic acid) and thirty kilos of sodium acetate. After combination the mass is neutralized with sodium carbonate, and the dyestuff is salted out. It dissolves in water with yellow-brown coloration and in concentrated sulfuric acid with red-brown coloration. It dyes wool in an acid-bath red-brown tints becoming yellowish brown and fast to light and fulling when subsequently chromed. By dyeing the dyestuff in copper vessels the tints obtained by subsequent chroming offer the same yellowish brown—that is to say, the copper has not any influence on the tints obtained.

In analogous manner other dyestuffs are obtained with other derivatives of triamidobenzene. For instance, the diamidosulfophenylalphanaphthylamin (obtained by condensation of 2:4-dinitro-1-chlorobenzene-6-sulfonic acid with alpha-naphthylamin and subsequent reduction) gives with the diazo derivative of picramic acid a dyestuff which dyes wool in an acid-bath reddish-brown tints turning to yellowish brown by being subsequently chromed and which is also characterized by its fastness to copper and copper salts.

What I claim is—

1. The described process for the manufacture of brown monoazo dyestuffs, developed by chroming, which process consists in combining triamidobenzene derivatives corresponding to the general formula

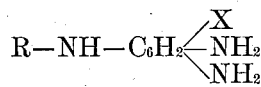

with orthodiazophenol derivatives.

2. As new articles of manufacture, the brown monoazo dyestuffs, corresponding to the general formula

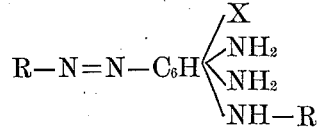

which constitutes in dry state, dark-colored powders, easily soluble in water with yellow to brown color and dye wool in an acid-bath brown tints, becoming fast to light and fulling by chroming.

In witness whereof I have hereunto signed my name, this 1st day of July, 1905, in the presence of two subscribing witnesses.

THILO KROEBER.

Witnesses:
GEO. GIFFORD,
AMAND RITTER.